United States Patent Office 2,928,245
Patented Mar. 15, 1960

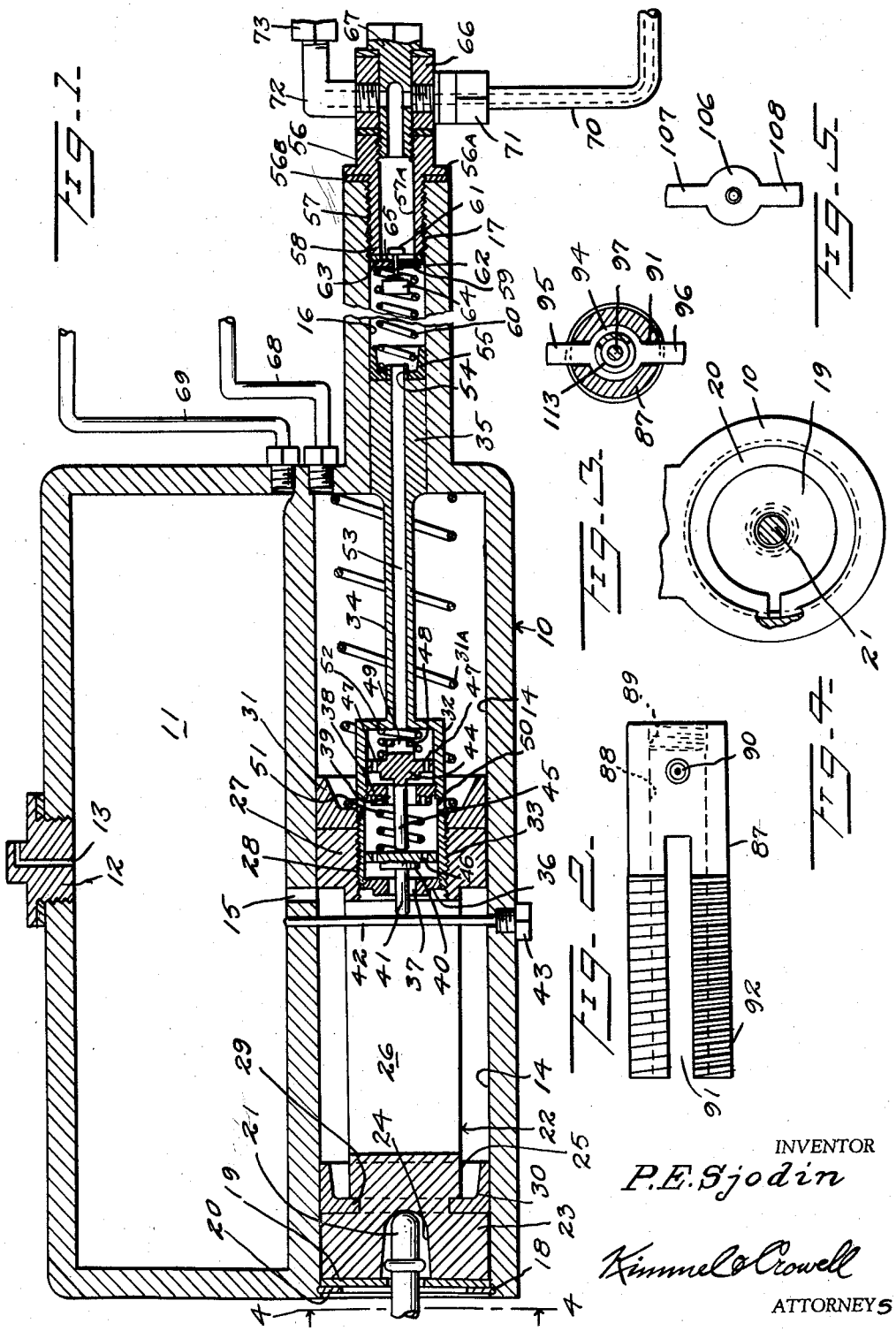

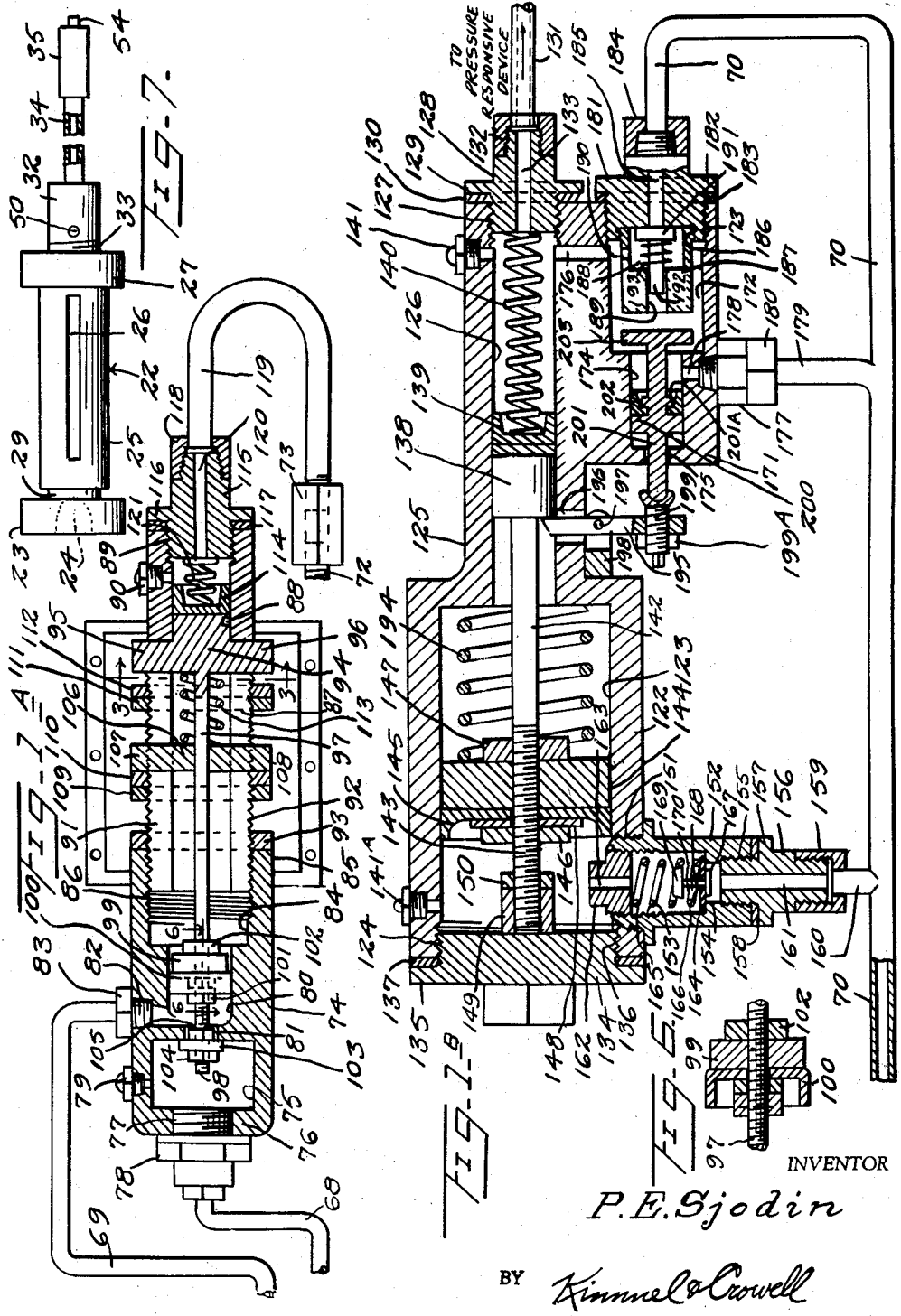

2,928,245

HYDROMECHANICAL AUTOMATIC PROGRESSIVE POWER RATIO TRANSMISSION SYSTEM

Peter E. Sjodin, San Antonio, Tex.

Application January 30, 1956, Serial No. 562,176

3 Claims. (Cl. 60—54.6)

The present invention relates to hydraulic systems, and more particularly, to such systems that include means to intensify the pressures exerted on the hydraulic fluid to multiply the forces exerted thereby.

The primary object of the invention is to multiply the forces exerted by the brake pedal on the hydraulic brake fluid to create the effect of power brakes without increasing the stroke of the brake pedal.

Another object of the invention is to provide a hydraulic system having a pressure intensifying action which occurs after the initial slack has been removed from the system.

A further object of the invention is to provide a hydraulic system incorporating means for intensifying the pressure exerted on the hydraulic fluid which is operated completely by the action of a single lever with the intensifying action occurring at a predetermined pressure of the hydraulic fluid.

A still further object of the invention is to provide a structure of the class described which will be inexpensive to manufacture, simple to install and adjust, and relatively free from maintenance problems throughout the effective life thereof.

Other objects and advantages will become apparent in the following specification when considered in the light of the attached drawings, in which:

Figure 1 is a longitudinal section taken through the medial line of the master cylinder of the invention.

Figure 1A is a continuation of Figure 1 illustrating the pressure control unit.

Figure 1B is a continuation of Figure 1 illustrating the secondary intensifying unit.

Figure 2 is a side elevation of the cylinder of the control mechanism.

Figure 3 is a transverse cross-section taken along the line 3—3 of Figure 1A, looking in the direction of the arrows.

Figure 4 is a transverse fragmentary cross-section taken along the line 4—4 of Figure 1, looking in the direction of the arrows.

Figure 5 is an end elevation of the torsion spring mounting plate.

Figure 6 is a fragmentary longitudinal cross-section taken along the line 6—6 of Figure 1A, looking in the direction of the arrows.

Figure 7 is a side elevation of the master cylinder piston.

Referring now to the drawings in detail wherein like reference numerals indicate like parts throughout the several figures, the reference numeral 10 indicates generally a master cylinder having a reservoir 11 closed by a filler cap 12 having a vent 13 extending therethrough to the atmosphere. A cylinder 14 extends across the bottom of the master cylinder 10 and is provided with a port 15 communicating with the reservoir 11.

A cylinder 16 extends axially of the cylinder 14 and projects outwardly from the master cylinder 10. The cylinder 16 is internally threaded at its outer end at 17. The cylinder 14 is provided with an annular groove 18 adjacent the end thereof opposite the cylinder 16. An end wall 19 is positioned within the cylinder 14 and supported therein by spring ring 20 engaged in the groove 18.

A link 21 projects through the center of the end wall 19 and engages a master cylinder piston, generally indicated at 22. The master cylinder piston 22 is provided with a cylindrical portion 23 having a recess 24 extending into one end thereof and adapted to receive the link 21. An elongated cylindrical body 25 extends from the cylindrical portion 23 and is provided with a longitudinally extending slot 26 extending completely therethrough.

A second cylindrical portion 27 of the same diameter as the cylindrical portion 23 is integrally formed on the piston 22 at the end thereof opposite the cylindrical portion 23. The cylindrical portion 27 is provided with an axial threaded bore 28 which communicates with the slot 26 at one end and the end of the cylindrical portion 27 at the other end.

An annular groove 29 is formed in the cylindrical body 25 adjacent the cylindrical portion 23. A rubber piston cup 30 having a diameter to engage the side walls of the cylinder 14 is positioned so that the rear portion thereof engages within the annular groove 29. A second piston cup 31 is positioned within the cylinder 14 in engagement with the end face of the cylindrical portion 27. A coil spring 31A has one end engaging the rubber cup 31, and the other end engaging the end of the cylinder 14.

A cylinder 32 is provided with external threads 33 adjacent one end thereof which cooperate with the threads 28 of the cylindrical portion 27 to hold the cylinder 32 therein. A reduced tubular extension 34 projects from the cylinder 32 and carries a piston 35 adjacent the outer end thereof with the piston 35 extending into the cylinder 16.

An inner end wall 36 is threadedly attached to and extends across the inner end of the cylinder 32 and is provided with an axial opening 37. A second wall 38 somewhat smaller in diameter than the wall 36 is also threadedly attached and is positioned across the cylinder 32 at a point spaced from the wall 36 and likewise is provided with an axial bore 39.

A piston valve 40 is mounted for reciprocation within the cylinder 32 and has a piston rod 41 extending through the bore 37 of the wall 36 to engage a stop pin 42 extending through the slot 26 into the side walls of the cylinder 14. A head 43 is attached to the pin 42 and threads into the cylinder 14 to support the pin 42 therein. The valve 40 is adapted to engage and close the port 37 in the wall 36.

A valve piston 44 somewhat smaller in diameter than the piston 40 is mounted for reciprocation in the cylinder 32 between the wall 38 and the end of the cylinder 32. The valve 44 is provided with a piston pin 45 which extends through the bore 39 in the wall 38 to engage the valve 40. However, this engagement of the piston pin 45 and the valve 40 will not occur when the valves 40 and 44 are in closed position. Both the piston 40 and the piston 44 are provided with ports 46 and 47, respectively, to permit the passage of fluid therethrough. A stop 48 is formed on the outer side of the piston 44 to engage against the end of the cylinder 32 thus limiting the movement of the piston 44.

A plurality of ports 49 extend through the stop 48 to permit the flow of fluid from the cylinder 32 to the tube 34 or from the tube 34 to the cylinder 32 when the piston 44 is in its fully extended position. The cylinder 32 is provided with a plurality of ports 50 to permit the free flow of fluid between the cylinder 14 and the cylinder 32. A coil spring 51 engages the piston 40 at one end and the wall 38 at the other, normally biasing the piston 40 into position to close the bore 37. A coil spring 52 engages the end of the cylinder 32 at one end and the piston 44 at the other and biases the piston 44 into position to close the port 39 under normal conditions.

The tubular extension 34 is provided with a bore 53 which extends completely through the piston 35. A flange 54 projects beyond the piston 35 and forms a guide for a rubber piston cup 55 which is adapted to reciprocate in the cylinder 16.

A fitting 56 having an externally screw threaded extension 57 and a bore 57A is mounted in the end of the cylinder 16 by means of a thread 17. The fitting 56 has a flange 56A which engages a gasket 56B to seal the fitting 56 against the end of the cylinder 16. A valve seat 58 is positioned against the inner end of the threaded extension 57. A disk valve 59 engages against the valve seat 58 closing the bore 57A of the fitting 56. A coil spring 60 engages the valve 59 at one end and the cup 55 at the other, normally biasing these members against their supports.

A valve 61 having a valve stem 62 extending therefrom projects through a bore 63 in the valve 59. A head 64 is formed on the end of the valve stem 62 and a spring 65 extends between the head 64 and the valve 59 normally maintaining the valve 61 in bore 63 in closing position. An adjustable fitting 66 is secured to the outer end of the fitting 56 by means of a hollow bolt 67.

A conduit 68 extends from the cylinder 14 and a second conduit 69 extends from the reservoir 11. A conduit 70 extends from a fitting 71 on the fitting 66 and an elbow 72 extends from the fitting 66 to a coupling 73.

A body 74, illustrated in Figure 1A, is positioned adjacent the master cylinder 10 and adapted to be connected thereto by conduits 68 and 69 and elbow 72. The body 74 is provided with a bore 75 closed by an end wall 76 having a threaded bore 77 extending therethrough. A fitting 78 is threadedly connected to the threaded bore 77 at one end and to the conduit 68 at the other end. A bleeder fitting 79 extends through the side of the bore 75 for purposes to be described. A bore 80 extends axially of the body 74 and is connected to the bore 75 by means of a port 81.

A threaded bore 82 extends radially from the bore 80 at the end thereof adjacent the port 81. A fitting 83 is threadedly connected to the threaded bore 82 at one end and to the conduit 69 at the other end. An axial bore 84 having a diameter somewhat larger than the bore 80 communicates with the bore 80 and extends through the end 85 of the body 74. The bore 84 is internally screw threaded at 86 for purposes to be described.

A cylinder 87 is provided with an internal bore 88 which is threaded at 89 adjacent one end of the cylinder 87. The cylinder 87 is provided with a bleeder fitting 90 in communication with the bore 88. A longitudinal slot 91 extends into the cylinder 87 from the end thereof opposite the threads 89 and communicates with the bore 88. The end of the cylinder 87 containing the longitudinal slot 91 is externally threaded at 92 and is adapted to be threadedly engaged in the bore 84 as illustrated in Figure 1A.

A lock nut 93 engages the threads 92 on the cylinder 87 and the end 85 of the body 74 to lock the cylinder 87 to the body 74. A piston 94 is mounted for reciprocation in the cylinder 88 and is provided with a pair of oppositely extending ears 95 and 96 projecting through the slot 91 in the cylinder 87. The piston 94 is provided with a piston rod 97 which extends through the bore 84, the bore 80, the port 81, and into the bore 75. The outer end 98 of the piston rod 97 is externally threaded and carries a piston 99 and rubber piston cup 100 thereon clamped between clamping nuts 101 and 102.

A valve 103 is secured to the piston rod 97 by means of clamping nuts 104 and 105. The valve 103 is positioned within the bore 75 and is adapted to engage the port 81 to prevent communication between the bore 75 and the bore 80. The piston 99 and the piston cup 100 are positioned within the bore 80 and are adapted to prevent communication between the bore 80 and the bore 84.

A torsion spring mounting plate 106 is positioned within the bore 88 and has a pair of ears 107 and 108 projecting outwardly therefrom through the slot 91 in the cylinder 87. A pair of locking stop nuts 109 and 110 engage over the threads 92 on the cylinder 87 and provide a positive stop for the torsion spring mounting plate 106. Another pair of locking clamp nuts 111 and 112 are likewise engaged over the threads 92 of the cylinder 87 to form a stop for the piston 94.

A torsion coil spring 113 is positioned over the piston rod 97 in engagement with the piston 94 at one end and the torsion spring mounting plate 106 at the other end. A rubber piston cup 114 is positioned against the piston 94 to seal the bore 88. A fitting 115 is threaded into the threads 89 at the end of the bore 88 at one end thereof and has a radial flange 116 extending outwardly therefrom to engage a gasket 117 lying against the end of the cylinder 87.

A coupling 118 is detachably secured to the fitting 115 and supports a conduit 119 in communication with a port 120 extending through the fitting 115. A coil spring 121 engages against the inner end of the fitting 115 at one end and the piston cup 114 at the other end. The conduit 119 is connected to the coupling 73 to communicate with the elbow 72.

Referring now to Figure 1B, a body 122 is provided with a bore 123 having an internally threaded end portion 124. A reduced portion 125 extends axially of the body 122 and has a bore 126 therein extending axially of the bore 123 and in communication therewith. The end of the bore 126 opposite the bore 123 is internally threaded as at 127. A fitting 128 is threaded into the threads 127 and has an annular flange 129 extending outwardly therefrom in engagement with gasket 130 positioned against the end of the reduced portion 125.

A conduit 131 is secured to the fitting 128 by a coupling 132 and communicates with the bore 126 by a port 133 extending through the fitting 128. The conduit 131 extends to a pressure responsive device (not shown).

A cover plug 134 provided with a flange 135 and a screw threaded portion 136 which is adapted to be threaded into the threads 124 of the bore 123 with the flange 135 engaging against a gasket 137 effectively closes the bore 123. A piston 138 is mounted for reciprocation in the bore 126 and has a rubber piston cup 139 positioned thereagainst. A coil spring 140 engages against the piston cup 139 at one end and the fitting 128 at the other end normally biasing the piston cup 139 against the piston 138.

A bleeder fitting 141 is mounted in communication with the bore 126 for purposes to be explained. The piston 138 is provided with an elongated piston rod 142 extending through the bore 123 and having a threaded end portion 143. A piston 144 is mounted over the piston rod 142 within the bore 123 and has a piston cup 145 engaged thereagainst.

A pair of clamping nuts 146 and 147 secure the piston 144 and piston cup 145 and a washer 148 in clamped relation on the piston rod 142. An adjustable stop nut 149 is threaded onto the end of the piston rod 142 and clamped in adjusted position thereon by the lock nut 150. A bleeder fitting 141A is mounted in communication with the bore 123 for purposes to be explained.

A threaded bore 151 extends through the side of the body 122 in communication with the bore 123 adjacent the cover plug 134. A fitting 152 is threaded into the threaded bore 151 and has an internally threaded bore 153 extending from the inner end thereof. An annular shoulder 154 projects into the bore 153. A threaded bore 155 projects into the fitting 152 from the opposite end to the threaded bore 153 and extends into the shoulder 154. A fitting 156 is threadedly engaged in the threaded bore 155 and has a flange 157 thereon clamping a gasket 158 against the end of the fitting 152.

A coupling 159 secures a conduit 160 to the fitting 156 in communication with a port 161 extending through the fitting 156. The conduit 160 is connected to a conduit 70 extending from the master cylinder 10.

An adjustable plug 162 is threadedly engaged in the threaded bore 153 and has a port 163 extending therethrough. A valve 164 engages the shoulder 154 to close the bore 155. A coil spring 165 engages the valve 164 at one end and the plug 162 at the other end normally biasing the valve 164 against the shoulder 154.

A port 166 extends through the valve 164 and is closed by a valve 167 having valve stem 168 extending therethrough. A head 169 is formed at the free end of the valve stem 168 and engages a coil spring 170 which extends therefrom to the valve 164 normally biasing the valve 167 into port 166 closing position.

The offset portion 125 of the body 122 is provided with a downwardly offset portion 171 having a bore 172 extending through one end thereof. The bore 172 is threaded at 173 adjacent the outer end thereof. A bore 174 extends axially of the bore 172 in communication therewith and is somewhat smaller in diameter than the bore 172. The bore 174 is communicated to the atmosphere by means of a port 175. A port 176 connects the bore 126 with the bore 172.

A fitting 177 is connected to a port 178 in communication with the bore 174 and has a conduit 179 secured thereto by means of a coupling 180. The conduit 179 is connected at the other end thereof to the conduit 70. A fitting 181 is threaded into the threads 173 of the bore 172 and has a flange 182 which engages against a gasket 183 to seal the fitting 181 against the end of the offset portion 171.

A coupling 184 secures the terminal end of the conduit 70 to the fitting 181 in communication with the port 185 extending therethrough. The fitting 181 has an internally threaded shallow bore 186 extending axially from the inner end thereof. A plug 187 is threaded into the bore 186 and is provided with a bore 188 extending axially therein from the threaded end. A bore 189 communicates the bore 188 through the opposite end of the plug 187.

A port 190 extends through the side wall of the bore 188. A bypass valve 191 is mounted within the bore 188 and is adapted to engage against the fitting 181 to close the port 185. A valve stem 192 extends through the bore 189 to support the valve 191 and has a coil spring 193 engaged thereover extending between the valve 191 and the inner end of the bore 188. The coil spring 193 normally biases the valve 191 into port 185 closing position.

A coil spring 194 is positioned within the bore 123 between the piston 144 and an end of the bore 123 so as to normally bias the piston 144 toward the cover 134. A link 195 is engaged against the end of the piston 138 having the piston rod 142 extending therefrom and projects outwardly through a port 196 in the reduced portion 125. A pivot 197 pivotally secures the link 195 to a yoke 198 mounted on the cylinder 122. An adjustable stop 199 is threadedly attached to the outer end of the link 195 and locked thereon by means of a lock nut 199A.

A piston 200 is mounted on a piston rod 201 and is adapted to reciprocate in the bore 174. The piston rod 201 extends through the port 175 and engages against the stop 199. The piston rod 201 is provided with an annular shoulder 201A in spaced apart relation to the piston 200. A rubber piston cup 202 of a diameter to engage the inner wall of the bore 174 is positioned between the piston 200 and the annular shoulder 201A. A valve 203 is secured to the inner end of the piston rod 201 to engage the end of the bore 174 sealing it from the bore 172. The piston 200 and the piston cup 202 are positioned within the bore 174 to prevent communication between the fluid in the bore 174 and the atmosphere.

The valve 191 is adapted to be used as a bypass valve only, and remains closed during all normal operations in most hydraulic systems, being used only when the fluid pressure in the conduit 70 exceeds the fluid pressure in the conduit 131. This would be true in hydraulic systems such as pressure molding, die-forming, and/or punch press machines after steps of operation are completed and slack in the system develops between steps.

In the use and operation of the invention, the hydraulic system is filled with fluid in the conventional manner through the master cylinder filler port, closed by the filler cap 12. The air is bled out of the system in the conventional manner through the bleeder valves 79, 90, 141, 141A and all other bleeder valves in the system (not shown). The external operating force (not shown) in engagement with the link 21 moves the piston 22 to the right, as viewed in Figure 1, causing the cylindrical portion 27 to exert pressure on the fluid in the cylinder 14.

The fluid pressure in the cylinder 14 and the spring 51 moves the piston valve 40 to the left to close the port 37 in the wall 36 as the valve stem 41 leaves the trip bar 42, and the fluid flows from the cylinder 14 through the ports 50 into the cylinder 32, moving the valve 44 against the end wall of the cylinder 32. The fluid will flow through the bore 39, port 47, port 49, bore 53, cylinder 16, opening the valve 61 and through the bore 63 in the valve 59 and then through port 57A and into the conduit 70. The fluid will flow from the conduit 70 through the conduit 179, port 178 into the bore 174, around the valve 203 into the bore 172, as viewed in Figure 1B, through the port 176 into the bore 126, through the port 133, through the conduit 131 into the final pressure responsive device (not shown).

After the initial slack has been removed from the system and the predetermined amount of pressure is reached in the conduit 70 from cylinder 14 as a result of continued exertion of the external force, the fluid from conduit 70 will flow through the conduit 160 and the port 161. The valve 164 is forced off its seat permitting the fluid to flow through the port 163 into the bore 123 moving the piston 144 to the right, as viewed in Figure 1B, against the torsion spring 194. Movement of the piston 144 causes the piston rod 142 to move the piston 138 to the right.

As the piston 144 and the piston 138 move to the right, the link 195 in engagement with the rear of the piston 138 is permitted to rotate about the pivot 197 to release the stop 199. The valve stem 201 in engagement with the stop 199 is released which permits the fluid under pressure in the bore 174 bearing against the piston 200 to close the valve 203 in the bore 174.

Further movement of the piston 138 in the bore 126, as a result of continued exertion of the external force, will effect a pressure in the conduit 131 above that which is in the conduit 70, and hence will apply a greater amount of pressure for purposes to be assigned, than is normally possible.

When it is desired to adjust the relative pressures affecting the pressure intensifying piston 35, the spring stop 106 is moved toward or away from the piston 94, as the case may be, by adjusting the stop nuts 109 and 110. The torsion of the spring 113 is thus varied to permit the piston 94 to operate at different pressures. The pressures operating the piston 94 causes the valve 103 to open due to the movement of the valve stem 97 thus releasing the pressure in the cylinder 14. The release of pressure in the cylinder 14 will permit the spring 52 to move the valve 44 to the left closing the port 39, converting the cylinder 16 into a pressure producing cylinder with further movement of the piston 35 therein increasing the pressure on the fluid.

Also as the valve 103 is opened, the fluid is permitted to flow from the cylinder 14 upon the forward motion of the cylindrical portion 27 through the conduit 68 into the bore 75 of the body 74, through the port 81 into the bore 80, through the conduit 69 and into the reservoir 11, releasing all pressure from the cylinder 14 and keeping it released as long as the piston 35 is activated. All of the external operating force is thus transmitting pressure to the piston 35, the smaller area of which consequently intensifies the pressure in the conduit 70.

The unit illustrated in Figure 1B receives the intensified pressure which is applied against the piston 144 and with the system being closed off between the conduit 70 and the conduit 131, the smaller piston 138 intensifies the pressure applied to the piston 144. Obviously, the difference in cross-sectional areas between the cylindrical portion 27 and the piston 35, and the piston 144 and the piston 138 must be determined to obtain the final pressure multiplication involved.

As the pressure is released by the external operating force from the master cylinder piston 22, the spring 31A along with the spring 60 will begin to move the piston 22 back to the left, as viewed in Figure 1, releasing the pressure in the conduit 70.

The spring 113 will move the piston 94 to the right, as viewed in Figure 1A, closing the valve 103 in the port 81.

The valve 167 in the port 166, as viewed in Figure 1B, opens as the fluid starts back toward the master cylinder 10.

As the master cylinder piston 22 continues to move back to the left, as viewed in Figure 1, the valves 40 and 44 will open. The atmospheric pressure from the vent 13 in the filler cap 12, on the fluid in the reservoir 11 counteracts the partial vacuum created in front of the cylindrical portion 27 and the piston 35 by the backward motion of the piston 22, moving the fluid from the reservoir 11. This partial vacuum created will cause the atmospheric pressure to force the fluid from the master cylinder reservoir 11 through the port 15 into the cylinder 14 through the slot 26, port 37, port 46 and into the cylinder 32 through the ports 50 and into the cylinder 14 and also through the port 39, port 47, port 49, bore 53 and into the cylinder 16, filling the cylinders 14 and 16 so it will be possible to pump more fluid into the conduit 70 if that is desired and if the master cylinder 22 is immediately urged forward again.

As the master cylinder piston 22 returns to the initial point as illustrated in Figure 1, the piston rod 41 will engage the stop pin 42 holding the valve 40 open away from the port 37. The piston pin 45 in engagement with the valve 40 will hold the valve 44 open away from the bore 39.

As the excess fluid in the bore 123 returns to the conduit 70 through the port 166 of the valve 167 and through the conduit 160, as viewed in Figure 1B, the spring 194 along with the spring 140 will move the pistons 138 and 144 to the left releasing the pressure in the conduit 131. As the pistons 138 and 144 return to the initial point, as illustrated in Figure 1B, the piston 138 will engage the link 195. The link 195 will rotate about the pivot 197, and the stop 199 in engagement with the valve stem 201 will move the valve 203 to the right opening the bore 174. The excess fluid in the conduit 131, used there to take up slack in the system, will return toward the master cylinder 10 flowing through the port 133 into the bore 126 through the port 176 into the bore 172 by the valve 203 into the bore 174 through the port 178, conduit 179 and into the conduit 70.

As the excess fluid in the conduit 70 returns to the master cylinder 10 through the bore 57A, the valve 59 will move off its seat 58, as viewed in Figure 1, and the fluid will flow around the valve 59 into the cylinder 16 through the bore 53, port 49 and into the cylinder 32 through the port 47, port 39, port 46, port 37, slot 26 and into the cylinder 14 through the port 15 and into the reservoir 11.

As all the excess fluid in the system, used there to take up the slack, is returned to the reservoir 11, the valve 59 seated by the spring 60, as illustrated in Figure 1, will retain a small amount of fluid pressure in the complete forward system. The valve 167 seated by the spring 170, as illustrated in Figure 1B, will retain an additional small amount of fluid pressure in the bore 123.

This amount of retained fluid pressure is necessary to keep all the rubber cups in shape and sealed against their respective cylinder walls so no air will enter the system.

The unit illustrated in Figure 1B is set by means of the adjusting plug 162 and is set to operate to open the valve 164 when sufficient pressure has been applied to the system to take up the lost motion.

The unit illustrated in Figure 1A is set by means of the stop nuts 109, 110 and is set to operate to open the valve 103 when sufficient pressure has been applied to the system to exceed by several pounds per square inch that needed to put the unit illustrated in Figure 1B into operation.

Having thus described the preferred embodiment of this invention, it should be understood that numerous modifications and structural adaptations may be resorted to without departing from the scope of the appended claims.

What is claimed is:

1. A fluid pressure system comprising means including a piston for applying an initial low pressure to said system, a high pressure means including a second piston rigidly secured to said first piston for intensifying the pressure in said system, means actuated by the initial pressure of fluid in said system for simultaneously deactivating said low pressure means and activating said high pressure mean, a second means actuated by the initial pressure of fluid in said system for further deactivating said low pressure applying means and simultaneously activating a secondary high pressure means for further intensifying the pressure in said system and means for bypassing said first high pressure applying means with pressures from said secondary high pressure applying means upon failure of said first high pressure applying means.

2. A fluid pressure attachment for hydraulic pressure systems comprising a means for successively exerting low and high pressures on the fluid in said system, means responsive to pressures in said system for adjusting said exerting means from low pressure to high pressure, a pressure intensifying cylinder having a pair of axially aligned bores of different diameters, a piston mounted in each bore, means connecting said pistons for simultaneous reciprocation, means communicating the larger of said bores with said means for exerting low and high pressures for actuation of said piston therein by fluid pressure from said exerting means, means communicating the smaller bore with said exerting means, means communicating the smaller bore with a fluid pressure responsive means, and means for closing the means communicating the smaller bore with said exerting means whereby the pressures exerted by said piston in said smaller bore will be extended solely to the said fluid pressure responsive means.

3. A device as claimed in claim 2 wherein said means connecting said pistons for simultaneous reciprocation is provided with means for axially adjusting one piston with respect to the other piston.

References Cited in the file of this patent

UNITED STATES PATENTS

| | | | |
|---|---|---|---|
| 2,190,238 | Lepersonne | Feb. 13, | 1940 |
| 2,194,657 | Hirsch | Mar. 26, | 1940 |
| 2,272,360 | Swift | Feb. 10, | 1942 |
| 2,291,056 | Pallady | July 28, | 1942 |
| 2,317,601 | Fowler | Apr. 27, | 1943 |
| 2,321,479 | Freeman | June 8, | 1943 |
| 2,351,953 | Goepfrich | June 20, | 1944 |
| 2,717,745 | Carter | Sept. 13, | 1955 |
| 2,739,448 | Troy | Mar. 27, | 1956 |
| 2,820,347 | Highland | Jan. 21, | 1958 |